Oct. 25, 1932.   E. PILKINGTON   1,884,204
FLOWERPOT DRAINER
Filed Dec. 8, 1931
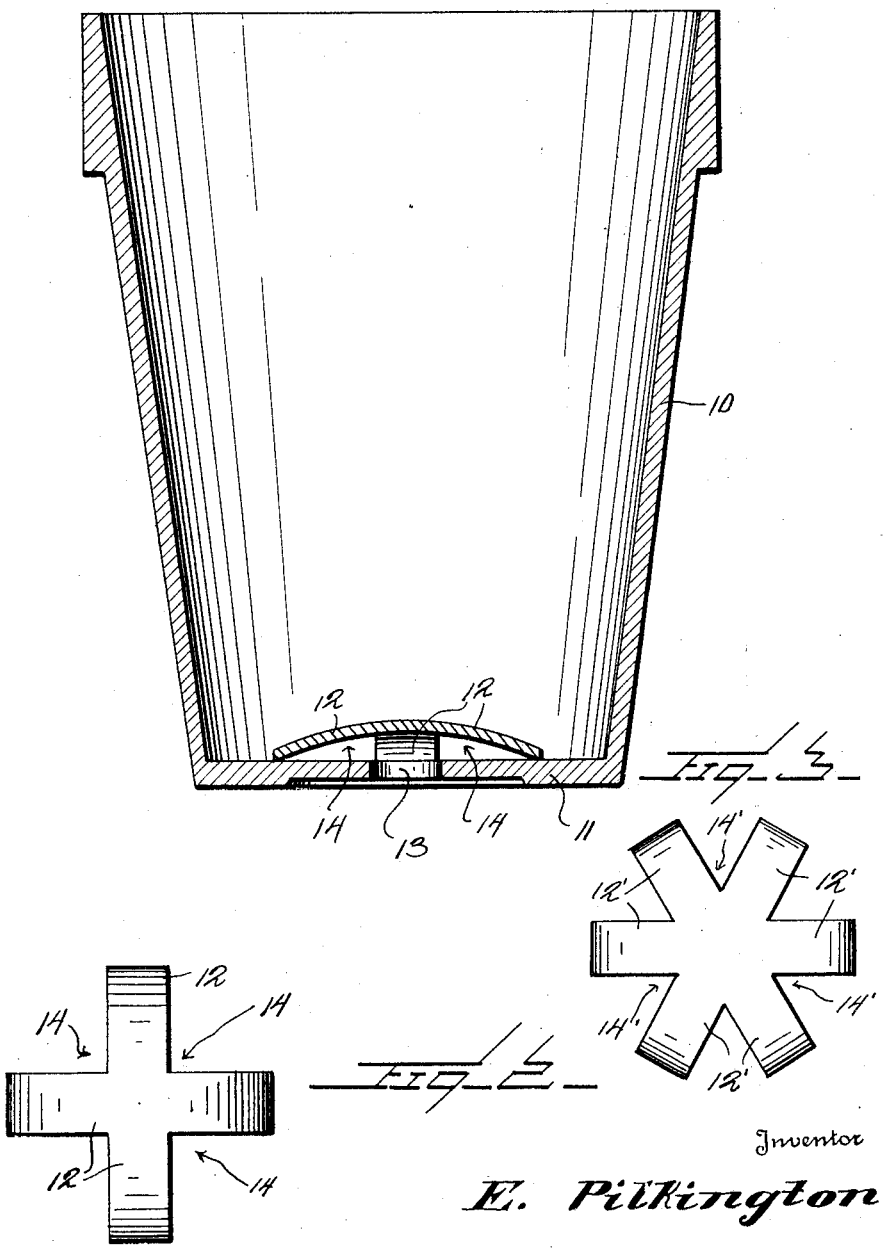

Patented Oct. 25, 1932

1,884,204

UNITED STATES PATENT OFFICE

EDWARD PILKINGTON, OF ALTOONA, PENNSYLVANIA

FLOWERPOT DRAINER

Application filed December 8, 1931. Serial No. 579,742.

This invention relates to means for regulating the drainage of water from flower pots in order to prevent souring of the water within the pot.

An object of this invention is to provide means which may be inserted or placed in the bottom of any conventional flower pot having an opening in the bottom thereof, whereby the passage of the water through the opening will be retarded a sufficient length of time to permit the ground in the pot to become thoroughly soaked or moistened with the water.

Another object of this invention is to provide a device of this kind which is so constructed that it will not readily become clogged with dirt or sand washed down by the water.

A further object of this invention is to provide a device of this kind which is exceedingly simple in construction and can be readily and cheaply manufactured.

The above and various other objects and advantages of this invention will in part be described in and in part be understood from the following detailed description of the present preferred embodiment, the same being illustrated in the accompanying drawing, wherein:—

Figure 1 is a vertical sectional view taken substantially through the vertical center of a flower pot having a device constructed according to the preferred embodiment of this invention mounted therein, the device being shown partly in section and partly in detail;

Figure 2 is a detail top plan view of the device;

Figure 3 is a detail top plan view of another form of this device.

Referring to the drawing wherein like numerals of reference designate corresponding parts throughout the several views, the numeral 10 designates generally a flower pot of conventional construction which is provided with a bottom 11 having an opening 13 therethrough whereby the water placed in the top of the pot may drain outwardly therefrom so as to prevent souring of the ground.

In order to provide means whereby the water placed in this pot 10 will be retarded in its passage through the opening 13, I have provided a retarding means comprising a plurality of intersecting resilient arms or bars 12 which are curved in construction, so as to provide an air chamber or pocket 14 beneath the arms. In the construction of this device, these intersecting arms 12 are made of material which will not readily corrode or be affected by the moisture within the flower pot 10. If desired, these arms 12 may be constructed integral one with the other, being formed of material with a solid central portion.

In the use of this device, the water retarding member is placed in the bottom 11 of the pot 10, so that the central portion thereof will overlie the opening 13 in the bottom 11. The ground or dirt may then be placed in the pot 10 and the arms 12 will prevent the packing of the dirt about the drain opening 13.

It will be noted from the foregoing that the central portion of this device is solid, and due to the fact that it overlies the opening 13, the water must pass through the opening 13 from the side openings or the spaces beween the arms 12 of this device. In this manner, the water draining downwardly through the dirt will not wash channels or the like therethrough and will be retained within the flower pot until the dirt has been thoroughly moistened.

As shown in Fig. 3, the device herein disclosed is constructed of six arms 12' which form a chamber 14'. It will, therefore, be obvious that this device may be made of any desired number of arms 12.

It is, of course, understood that various changes and modifications may be made in the details of construction and design of the above specifically described embodiments of this invention without departing from the spirit thereof, such changes and modifications being restricted only by the scope of the following claims.

What is claimed is:—

1. A device as set forth, comprising a plurality of connected arms, each arm being curved longitudinally whereby to raise the central portion thereof above the bottom of a flower pot, said central portion being constructed to overlie the drain opening of the flower pot, the space between each pair of arms constituting drain openings.

2. A device as set forth, comprising a plurality of radiating connected arms having parallel sides, each arm being curved longitudinally whereby to raise the central portion thereof above the bottom of the flower pot, the space between abutting edges of the arms permitting the draining of water beneath the device.

In testimony whereof I hereunto affix my signature.

EDWARD PILKINGTON.